US008335540B2

United States Patent
Wang (10) Patent No.: US 8,335,540 B2
(45) Date of Patent: Dec. 18, 2012

(54) METHOD AND GSM SYSTEM FOR REALIZING FLAT MOBILE COMMUNICATION, AND ENHANCED BASE STATION

(75) Inventor: Xinhui Wang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 13/222,375

(22) Filed: Aug. 31, 2011

(65) Prior Publication Data

US 2011/0312329 A1    Dec. 22, 2011

Related U.S. Application Data

(63) Continuation of application No. PCT/CN2009/073334, filed on Aug. 18, 2009.

(30) Foreign Application Priority Data

Mar. 12, 2009    (CN) .......................... 2009 1 0079482

(51) Int. Cl.
    *H04B 1/38*    (2006.01)
(52) U.S. Cl. ........ 455/561; 455/436; 455/437; 455/438; 455/439; 455/440; 455/441; 455/442; 455/443; 455/444; 370/331

(58) Field of Classification Search .......... 455/436–444, 455/561; 370/331
See application file for complete search history.

(56) References Cited

U.S. PATENT DOCUMENTS

2008/0305772 A1* 12/2008 Balasubramanian et al. 455/411

* cited by examiner

*Primary Examiner* — Amancio Gonzalez
(74) *Attorney, Agent, or Firm* — Bright IP Law Offices (57) ABSTRACT

The present invention discloses an enhanced base station, which includes a Um interface functional module (1), a base station functional module (2), a controller functional module (3), and an A interface functional module (4), wherein the Um interface functional module (1), the base station functional module (2) and the A interface functional module (4) carry out the function of a BTS, and the controller functional module (3) and the A interface functional module (4) carry out the function of a BSC. The present invention also provides a method and a GSM system for realizing a flat mobile communication, wherein the enhanced base station carries out the functions of a BTS and a BSC in a conventional GSM system. Application of the present invention can decrease the number of devices for constituting the GSM system and the number of forwarding devices between a calling MS and a called MS, therefore reduce the time for service data transmission and improve the reliability of the transmission.

8 Claims, 4 Drawing Sheets

METHOD AND GSM SYSTEM FOR REALIZING FLAT MOBILE COMMUNICATION, AND ENHANCED BASE STATION

This is a continuation of International Application PCT/CN2009/073334, with an International Filing Date of Aug. 18, 2009, which claims priority to Chinese Application No. 200910079482.3, filed Mar. 12, 2009, each of which is incorporated by reference.

FIELD OF THE INVENTION

The present invention relates to the field of mobile communication, especially to a method and a GSM System (Global System for Mobile Communications) for realizing a flat mobile communication, and an enhanced base station.

BACKGROUND OF THE INVENTION

Figure 1:
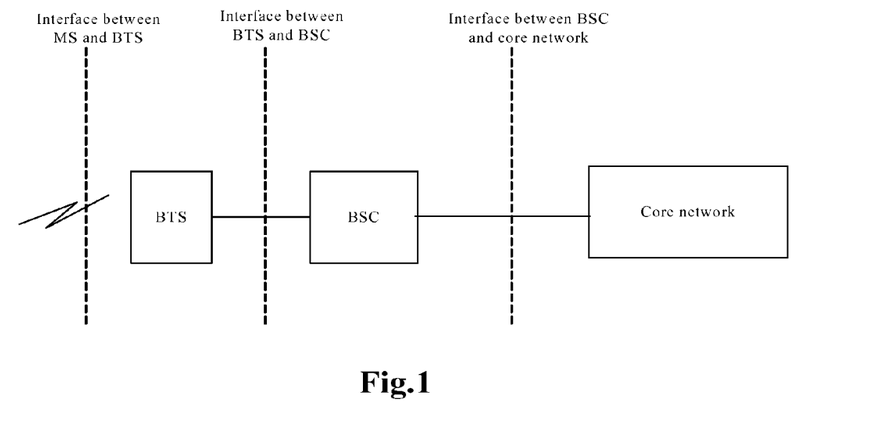
FIG. 1 is a schematic diagram of the network architecture of a conventional GSM.

As shown in FIG. 1, the network architecture of a conventional GSM system includes three layers of a core network, a BSC (Base Station Controller) and a BTS (Base Station, or Base Transceiver Station), wherein the interface between the core network and the BSC is referred to as A interface, the interface between the BSC and the BTS is referred to as Abis interface, and the interface between the BTS and a MS (Mobile Station) is referred to as Um interface. The core network, the BSC and the BTS collaborate to provide the MS with complete mobile voice service functions.

Based on the above mentioned network architecture, when the GSM system is providing a voice service for two MSs under two respective BSCs, the brief realization process is as follows. A calling MS initiates a call to a calling BTS, and a calling request is transmitted to a called BTS via a calling BSC, the core network and a called BSC. The called BTS calls a called MS in the coverage of the called BTS, and then, the calling MS and the called MS establish a conversation, and transmit every voice frame through the calling BTS, the calling BSC, the core network, the called BSC and the called BTS. It can be concluded that when the voice service is performed between two MSs under different BSCs, every service data or signaling which is interacted between the two MSs needs to go through the processing of five network element devices, i.e. the calling BTS, the calling BSC, the core network, the called BSC, and the called BTS. Due to the processing of so many devices, the unreliability of the processing and a calling delay will be increased.

SUMMARY OF THE INVENTION

In view of the above, the main purpose of the present invention is to provide a method and a GSM system for realizing a flat mobile communication, and an enhanced base station, which can solve the problem of low reliability of the transmission of the voice frame and relatively long delay of calling.

To achieve the above mentioned purpose, the technical solution of the present invention is realized in the way as follows.

According to one aspect of the present invention, an enhanced base station is provided.

The enhanced base station according to the present invention includes: a Um interface functional module, a base station functional module, a controller functional module, and an A interface functional module.

The Um interface functional module is configured to receive service data and signaling sent by a mobile station (MS), or send service data and signaling to the MS;

The base station functional module is configured to carry out a wireless channel resource management according to a signaling sent by the MS or under control of a controller functional module, and control the Um interface functional module and an A interface functional module to forward the service data;

The controller functional module is configured to control the base station functional module to carry out the wireless channel resource management; and The A interface functional module is configured to receive the service data or signaling sent by a core network, or send the service data or signaling to the core network.

The enhanced base station further includes:

an inter-base-station interface functional module, configured to perform a signaling interaction between enhanced base stations.

The base station functional module includes:

a resource management module, configured to allocate and activate, according to a wireless channel resource request sent by the MS or a switching resource preparation command sent by the controller functional module, wireless channel resources for the MS, and establish a connection with the MS; and configured to disconnect with the MS and release the wireless channel resources occupied by the MS according to a release command sent by the controller functional module; and a forwarding control module, configured to control the A interface functional module to send the service data, which are sent by the MS, to the core network, and control the Um interface functional module to send the service data, which are sent by the core network, to the MS.

According to another aspect of the present invention, a GSM system for realizing a flat mobile communication is provided.

The GSM system for realizing a flat mobile communication according to the present invention includes: an enhanced base station and a core network.

The enhanced base station is configured to manage wireless channel resources according to a signaling sent by a mobile station (MS) or a core network; and configured to send service data, which are sent by the MS, to the core network, or send service data, which are sent by the core network, to the MS; and The core network is configured to send received service data or signaling, which are/is sent by a calling party, to the enhanced base station, or send service data or signaling, which are/is sent by the enhanced base station, to the calling party.

The enhanced base station comprises: a Um interface functional module, a base station functional module, a controller functional module and an A interface functional module;

correspondingly, the enhanced base station provides a Um interface for the MS via the Um interface functional module; carries out a wireless channel resource management and forwarding of the service data via the base station functional module and the controller functional module; and connects with the core network, receives the service data or signaling sent by the core network, or sends the service data or signaling to the core network via the A interface functional module.

According to still another aspect of the present invention, a method for realizing a flat mobile communication is provided.

The method for realizing a flat mobile communication according to the present invention includes:

a core network sending a calling request, which is sent from a calling party, to a called enhanced base station; the called enhanced base station sending the received calling request to a cell covered by the called enhanced base station to call a called MS, and ordering the called MS to access the called enhanced base station; the core network sending an access completed command replied by the called enhanced base station to the calling party to complete a calling procedure; and the core network sending service data, which are sent from the calling party, to the called enhanced base station, and the called enhanced base station forwarding the service data to the called MS; the core network sending service data, which are sent by the called MS and forwarded by the called enhanced base station, to the calling party to realize a conversation between a calling terminal and a called terminal.

The step of the called enhanced base station sending the received calling request to a cell covered by the called enhanced base station to call a called MS, and ordering the called MS to access the called enhanced base station includes:

a. an A interface functional module of the called enhanced base station receiving the calling request sent by the core network, and sending the calling request to a controller functional module of the called enhanced base station; the controller functional module of the called enhanced base station forwarding the calling request to a base station functional module of the called enhanced base station, and the base station functional module sending the calling request to the cell under the called enhanced base station via a Um interface functional module;

b. the called MS replying, after receiving a paging command, a paging response to the called enhanced base station;

c. the Um interface functional module of the called enhanced base station receiving the paging response, and sending the paging response to the base station functional module of the called enhanced base station; the base station functional module of the called enhanced base station allocating a wireless channel for the called MS, activating the wireless channel, and sending an access command to the called MS; and d. the called MS receiving the access command, accessing the activated wireless channel, and replying an access succeeded command to the called enhanced base station.

The step of the called enhanced base station forwarding the service data to the called MS includes:

an A interface functional module of the called enhanced base station receiving the service data and sending the service data to a base station functional module of the called enhanced base station; the base station functional module of the called enhanced base station sending the service data to the called MS via a Um interface functional module;

the step of the called enhanced base station forwarding the service data, which are sent by the called MS, to the core network comprises:

the Um interface functional module of the called enhanced base station receiving the service data sent by the called MS and sending the service data to the base station functional module of the called enhanced base station; the base station functional module of the called enhanced base station sending the service data to the core network via the A interface functional module.

The method further comprises a cell switching flow between different enhanced base stations, which comprises:

a source enhanced base station receiving a measurement report reported by an MS, and sending a switching command to the core network if determining, according to the received measurement report, that it is required to perform a switching;

the core network sending to a target enhanced base station the received switching command sent from the source enhanced base station; the target enhanced base station receiving the switching command, and replying a switching request acknowledgement command to the core network after performing a switching resource preparation; the core network sending to the source enhanced base station the switching request acknowledgement command replied by the target enhanced base station; and the source enhanced base station ordering, after receiving the switching request acknowledgement command, the MS to access the target enhanced base station to complete the cell switching between different enhanced base stations.

The step of the target enhanced base station receiving the switching command and performing the switching resource preparation comprises:

an A interface functional module of the target enhanced base station receiving the switching command sent from the core network, and sending the switching command to a controller functional module of the target enhanced base station the controller functional module of the target enhanced base station sending, after receiving the switching command, a switching resource preparation command to a base station functional module of the target enhanced base station; after receiving the switching resource preparation command, the base station functional module of the target enhanced base station allocating a wireless channel to be used, activating the wireless channel to be used, and configuring a voice coding and decoding type corresponding to the wireless channel to be used.

The step of the source enhanced base station ordering, after receiving the switching request acknowledgement command, the MS to access the target enhanced base station includes:

a3. the source enhanced base station writing, after receiving the switching request acknowledgement command sent from the core network, related information of a target switching cell carried in the switching request acknowledgement command into a wireless interface switching command, and sending the wireless interface switching command to the MS;

b3. the MS accessing, after receiving the wireless interface switching command, the wireless channel to be used according to the related information of the target switching cell carried in the wireless interface switching command, and sending a wireless interface switching completed command to the target enhanced base station;

c3. the target enhanced base station forwarding the received wireless interface switching completed command to the core network; and d3. the core network receiving the wireless interface switching completed command, sending a release command to the source enhanced base station; the source enhanced base station releasing, after receiving the release command sent from the core network, the original wireless resources occupied by the MS, and sending a release completed command to the core network to complete the cell switching between different enhanced base stations.

In the method and the GSM system for realizing the flat mobile communication and the enhanced base station provided by the present invention, the enhanced base station independently carries out the functions of the BTS and the BSC in the conventional GSM system. Therefore, the number of devices for constituting the GSM system, and the forwarding devices through which the service data and signaling transmitted between the calling MS and called MS pass to get to the target terminal are decreased, that is, the flat mobile communication is achieved. Moreover, the time for transmitting the service data and signaling is reduced, and the reliability of transmission is improved, thus the problems of low reliability of voice frame transmission and relatively long delay of calling are solved.

Other features and advantages of the present invention will be illustrated in the specification hereinafter, and partly become obvious from the specification, or can be understood by the implementation of the present invention. The objects and other advantages of the present invention can be achieved and obtained through the structures specifically indicated in the clarified specification, claims, and drawings.

BRIEF DESCRIPTION OF THE DRAWINGS

The Drawings are used for providing further understanding of the present invention, and shall constitute one part of the present invention. They are used for providing explanation for the present invention in conjunction with the embodiments of the present invention, and shall not constitute limitations for the present invention. In the Drawings.

DETAILED DESCRIPTION OF THE EMBODIMENTS

Functional Overview

The basic concept of the present invention is: the enhanced base station independently carries out the functions of a BTS and a BSC in the conventional GSM system, and thus a GSM system including an enhanced base station and a core network is formed. The service data and signaling sent from the MS are only processed by the enhanced base station and the core network. Compared with the twice forwarding of the service data and signaling through the BTS and the BSC in the conventional GSM system, the number of forwarding devices is reduced, thus reducing the time for transmitting the service data and signaling and improving the transmission reliability.

According to an embodiment of the present invention, firstly, an enhanced base station is provided.

Figure 2:
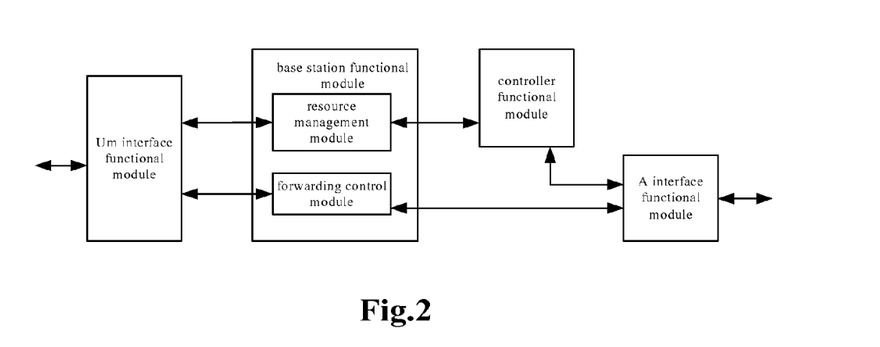
FIG. 2 is a structural schematic diagram of an enhanced base station according to an embodiment of the present invention.

FIG. 2 is a structure structural schematic diagram of an enhanced base transceiver station according to an embodiment of the present invention, the enhanced base station includes: a Um interface functional module, a base station functional module, a controller functional module, and an A interface functional module.

The Um interface functional module is used for receiving the service data and signaling sent by an MS, or sending service data and signaling to the MS, that is, providing a Um interface for the MS.

Herein, there are three layers of communication protocols on the Um interface functional module, which are physical layer, data link layer and application layer from bottom to top. In the above, the physical layer provides a transmission channel for a radio link, transmits data by using radio wave as its carrier, and provides logic channels with different functions, including service channel and logic channel, for the high layer. The data link layer provides reliable data between an MS and a BTS by using the LAPDm protocol which is a protocol relating to point movement applications and an LAPD (Link Access Procedure on the D-channel) protocol based on an ISDN (Integrated Service Digital Network). The application layer, including three sub-layers of CM, MM and RR, is mainly responsible for control and management protocols, and arranges the information of user and system control process on designated logical channels based on a certain protocol grouping.

The base station functional module is used for carrying out the wireless channel resource management according to the signaling sent by the MS or under the control of the controller functional module, and also used for controlling the Um interface functional module and the A interface functional module to forward the service data.

In the above, the step of the base station function module carrying out the wireless channel resource management according to the signaling sent by the MS or under the control of the controller functional module is:

allocating and activating a wireless channel for the MS according to a wireless channel resource request sent from the MS or a switching resource preparation command sent from the controller functional module, ordering the MS to access the wireless channel to make the MS access the GSM system, and disconnecting with the MS as well as releasing the wireless channel resources occupied by the MS according to a release command sent from the controller functional module.

In the above, the step of the base station functional module controlling the Um interface functional module and the A interface functional module to forward the service data specifically comprises:

the base station functional module forwards the service data received by the Um interface functional module to the A interface functional module for transmitting, and forwards the service data received by the A interface functional module to the Um interface functional module for transmitting, that is, the Um interface functional module and the A interface functional module can achieve service data interaction via the base station functional module. This solves the problem that in the conventional GSM system, for the impossibility of bypassing the Abis interface, the service data of the Um interface or the A interface can only reach the A interface or the Um interface through the forwarding of the BTS, the Abis interface and the BSC, and further decreases the delay of the service data transmission.

The controller functional module is used for controlling the base station functional module to carry out the wireless channel resource management.

In the above, controlling the base station functional module to carry out the wireless channel resource management includes:

in a switching flow, the controller functional module of a source enhanced base station determines whether it is required to perform a switching according to a measurement report reported by the MS, if it is not required, no switching will be executed; if it is required, it sends a switching command to the core network, and coordinates with the controller functional module of a target base station in controlling the base station functional modules of the source enhanced base station and the target enhanced base station to perform the switching; or, when a call is ended, the controller functional module forwards a release command sent by the core network to the base station functional module, and the base station functional module releases the original wireless resources occupied by the MS.

Herein, the signaling reported by the MS is sent to the base station functional module by the Um interface functional module after the Um interface functional module receives the signaling, and then sent to the controller functional module by the base station functional module.

The A interface functional module is used for receiving the service data or signaling sent from the core network, or sending service data or signaling to the core network.

Herein, there are three layers of transmission protocols for the service data on the A interface functional module, which are IP Transport Layer, UDP (User Datagram Protocol) Layer, and RTP (Real-time Transport Protocol) Layer from bottom to top. In the above, the IP Transport Layer supports the protocol versions of IPV4 and IPV6; the UDP is used for forwarding and transferring IP packets between network element entities, and the UDP layer works by the way of no connection, and therefore it can reduce the overhead of establishing, maintaining and releasing IP connections every time when service data are transferred; the RTP layer provides terminal-to-terminal transferring service with real-time features for service data.

There are five layers of transmission protocols for the signaling on the A interface functional module, which are IP Transport Layer, SCTP (Stream Control Transport Protocol) Layer, M3UA (User Adaption Protocol) Layer, SCCP (Signaling Connection Control Point Protocol) Layer, and BSSAP (Base Station Subsystem Application Protocol) from bottom to top. In the above, the IP Transport Layer supports the protocol versions of IPV4 and IPV6; the SCTP Layer is used for supporting the transmission of messages at the MTP3 part of the signaling in an IP network, and the management of distributed signaling nodes and SCTP transmission connection; the M3UA Layer realizes the transparent transmission of the signaling messages between signaling points, and provides connectionless and connection-oriented services; and the SCCP Layer processes A interface signaling procedures related to calling, mobility management and resource management.

This enhanced base station also comprises:

an inter-base-station interface functional module, which is used to realize the signaling interaction between enhanced base stations; wherein the signaling comprises the resource occupation ratio of the enhanced base station and the information of each cell under the enhanced base station, cell identification number, frequency, and the currently used voice coding and decoding type etc., and thus the resource occupation condition and the related information of the cells of the adjacent enhanced base stations can be acquired in time, which makes it convenient to find out an appropriate target enhanced base station during a switching.

The base station functional module further comprises: a resource management module and a forwarding control module; wherein, the resource management module is used to allocate and activate wireless channel resources for the MS and establish connection with the MS according to a wireless channel resource request sent from the MS or a switching resource preparation command sent by the controller functional module; and is also used to break the connection with the MS and release the wireless channel resources occupied by the MS according to a release command sent from the controller functional module; and the forwarding control module is used to control the A interface functional module to send service data sent by the MS to the core network, and control the Um interface functional module to send service data sent by the core network to the MS.

In the embodiment of the present invention, the Um interface functional module, the base station functional module and the A interface functional module carry out the functions of the BTS, and the controller functional module and the A interface functional module carry out the functions of the BSC, i.e., the enhanced base station in the embodiment of the present invention can carry out the functions of the BTS and the BSC, thus the enhanced base station can replace the BTS and the BSC in the conventional the GSM system. Therefore, the number of devices for constituting the GSM system, and the forwarding devices which the service data transmitted between the calling MS and the called MS pass to get to the target terminal are reduced, that is, the flat mobile communication is achieved. Moreover, the time for transmitting the service data is reduced, and the reliability of transmission is improved, thus the problems of low reliability of voice frame transmission and relatively long delay of calling are solved.

According to an embodiment of the present invention, a GSM system for realizing a flat mobile communication is also provided.

Figure 3:
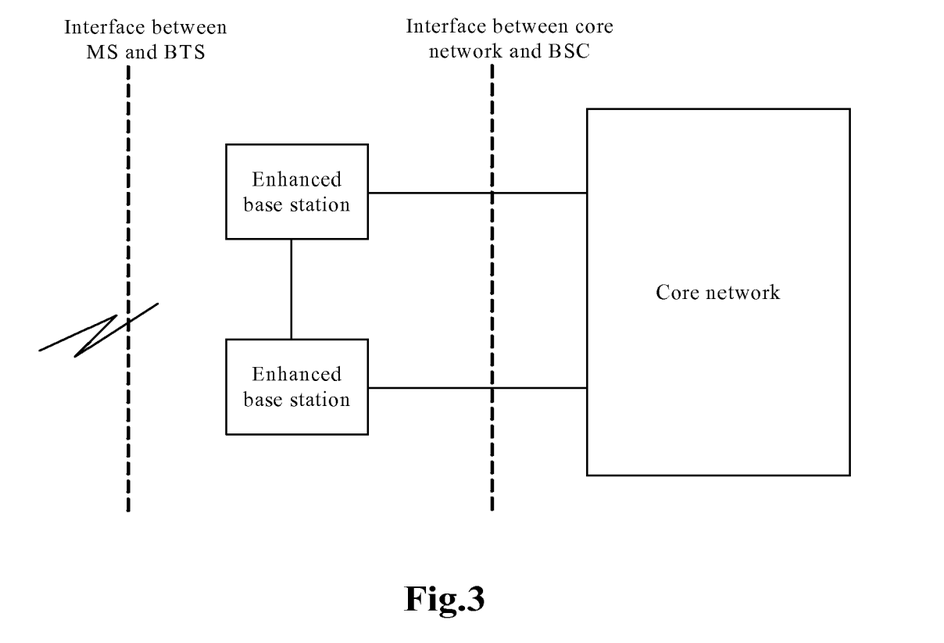
FIG. 3 is a schematic diagram of the network architecture of a GSM system for realizing a flat mobile communication according to an embodiment of the present invention.

The network architecture of the GSM system for realizing the flat mobile communication according to the embodiment of the present invention is as shown in FIG. 3, this system includes: an enhanced base station and a core network; wherein, the enhanced base station is used for managing wireless channel resources according to the signals sent from an MS or the core network; also used for sending to the core network the service data sent from the MS, or sending to the MS the service data sent from the core network; and the core network is used for sending to the enhanced base station the received service data or signaling sent from the calling party, or sending to the calling party the service data or signaling sent from the enhanced base station.

In the embodiment of the present invention, the enhanced base station carries out the functions of the BTS and the BSC in the conventional GSM system, which decreases the number of devices for constituting the GSM system and achieves the flat mobile communication.

In the above, the enhanced base station provides a Um interface for the MS via the Um interface functional module; carries out a wireless channel resource management and forwarding of the service data via the base station functional module and the controller functional module; connects with the core network, receives the service data or signaling sent by the core network, or sends the service data or signaling to the core network via the A interface functional module; and connects with an adjacent enhanced base station and performs a signaling interaction via the inter-base-station interface functional module.

According to an embodiment of the present invention, a method for realizing a flat mobile communication is also provided.

Figure 4:
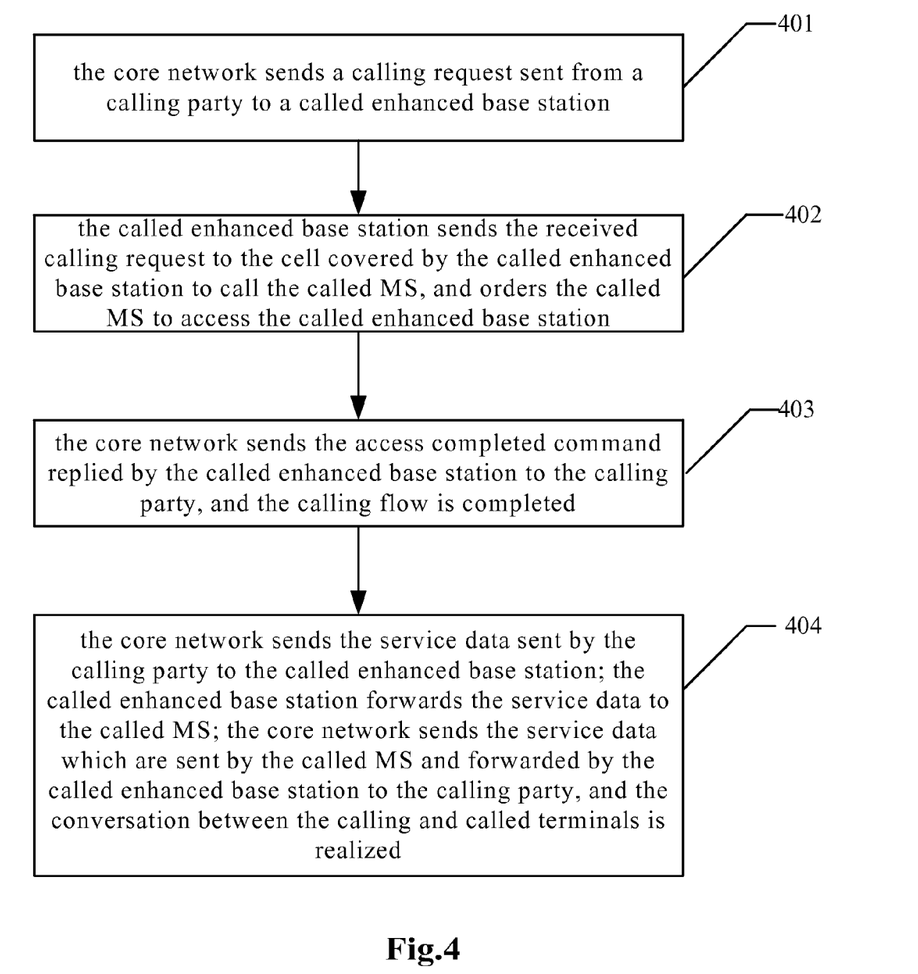
FIG. 4 is a schematic flowchart of a method for realizing a flat mobile communication by using an embodiment of the present invention.

The flow of the method for realizing the flat mobile communication according to the embodiment of the present invention is as shown in FIG. 4, and includes the steps as follows.

Step 401: a core network sends a calling request, which is sent from a calling party, to a called enhanced base station; wherein, the calling party can be either a fixed telephone network or a GSM mobile network; further, when the calling party is the GSM mobile network, a calling base station or a calling enhanced base station sends a calling request to the core network.

Herein, the step of sending the calling request to the called enhanced base station specifically includes the steps as follows.

Step a1. The core network receives a calling request sent from the calling party, and determines the location area of the called MS and the enhanced base station within the location area according to this calling request.

Step b1. The core network sends a paging command to the determined called enhanced base station.

Step 402: The called enhanced base station sends the received calling request to the cell covered by itself to call the called MS, and orders the called MS to access the called enhanced base station.

Herein, the step of the called enhanced base station calling the called MS, and ordering the called MS to access the called enhanced base station specifically includes the steps as follows.

Step a2. The A interface functional module of the called enhanced base station receives the calling request sent from the core network, and sends the calling request to the controller functional module of the called enhanced base station; the controller functional module of the called enhanced base station forwards the calling request to the base station functional module of the called enhanced base station, and this base station functional module sends the calling request to the cell under the called enhanced base station.

Step b2. After receiving the paging command, the called MS replies a paging response to the called enhanced base station.

Step c2. The Um interface functional module of the called enhanced base station receives the paging response, and sends the paging response to the base station functional module of the called enhanced base station; the base station functional module of the called enhanced base station allocates a wireless channel for the called MS, activates the wireless channel and sends an access command to the called MS.

Step d2. After receiving this access command, the called MS accesses the activated wireless channel and replies an access succeeded command to the called enhanced base station.

Step e2. The Um interface functional module of the called enhanced base station receives the access succeeded command and sends the access succeeded command to the base station functional module of the called enhanced base station; the base station functional module of the called enhanced base station sends an access completed command to the controller functional module of the called enhanced base station; the controller functional module of the called enhanced base station sends the received access completed command to the core network via the A interface functional module.

Step 403: The core network sends the access completed command replied by the called enhanced base station to the calling party, and the calling procedure is accomplished.

Step 404: The core network sends to the called enhanced base station the service data sent from the calling party; the called enhanced base station forwards the service data to the called MS; the core network sends to the calling party the service data which is sent from the called MS and forwarded by the called enhanced base station, and thus a conversation between the calling terminal and the called terminal is achieved. In the above, the calling terminal and the called terminal can be two MSs under different networks, and they can also respectively be a fixed telephone and an MS.

Herein, the step of the called enhanced base station forwarding the service data to the called MS specifically includes:

the A interface functional module of the called enhanced base station receives the service data and sends the service data to the base station functional module of the called enhanced base station; the base station functional module of the called enhanced base station sends the service data to the called MS via the Um interface functional module.

The step of the called enhanced base station forwarding the service data sent by the called MS to the core network includes:

the Um interface functional module of the called enhanced base station receives the service data sent by the called MS and sends the service data to the base station functional module of the called enhanced base station; the base station functional module of the called enhanced base station sends the service data to the core network via the A interface functional module.

Figure 5:
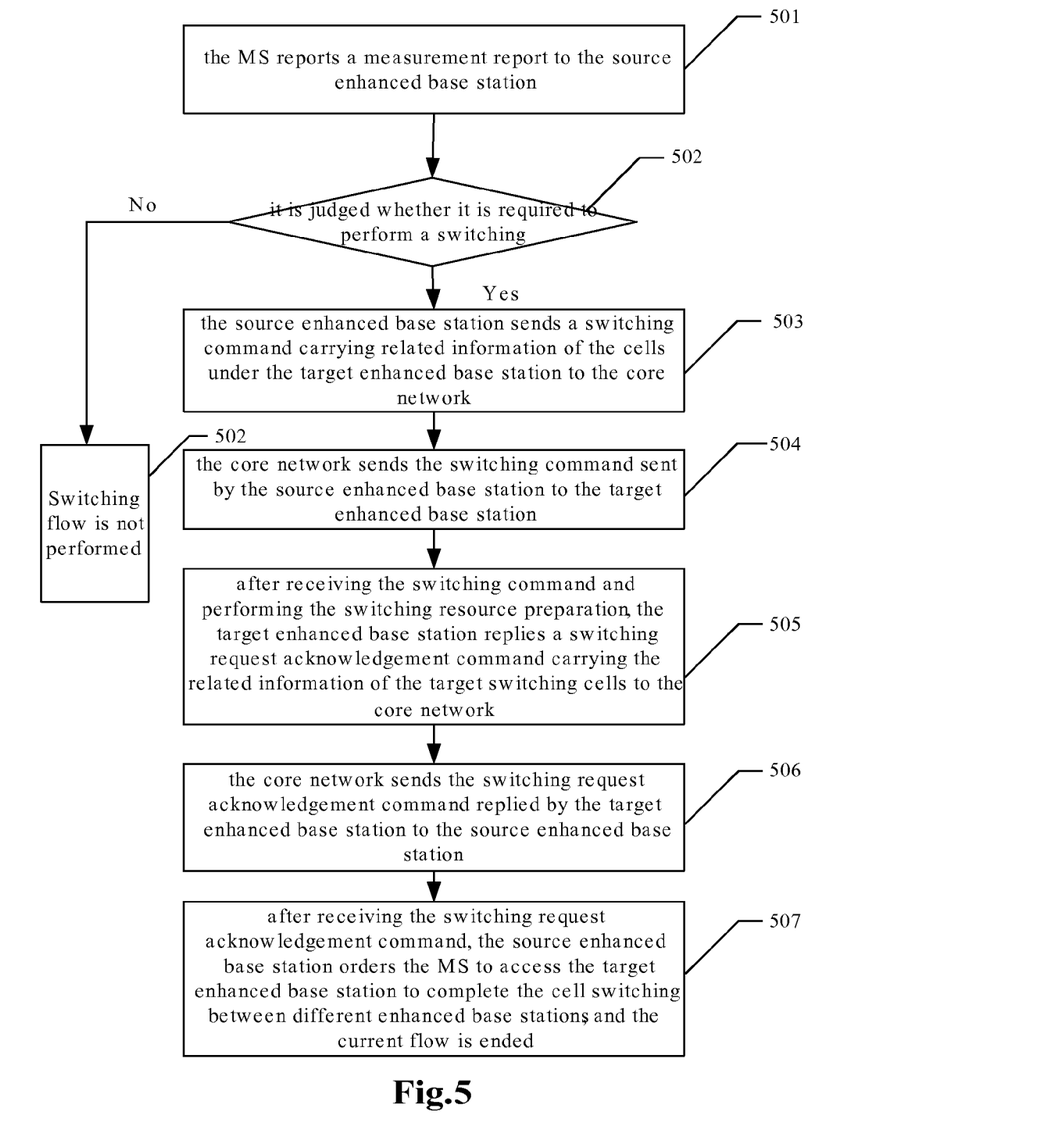
FIG. 5 is a schematic flowchart of cell switching between different enhanced base stations in the method for realizing the flat mobile communication by using an embodiment of the present invention.

The cell switching process between different enhanced base stations in the method for realizing the flat mobile communication according to the embodiment of the invention is as shown in FIG. 5, and the flow includes the steps as follows.

Step 501: the MS reports a measurement report to the source enhanced base station.

Step 502: The source enhanced base station receives the measurement report, and determines whether it is required to perform the switching according to the received measurement report, and if it is not required, it will not execute the switching process; if it is required, it will execute Step 503 and performs the switching.

In the above, the measurement report is received by the Um interface functional module of the source enhanced base station and sent to the base station functional module of the source enhanced base station, and then forwarded to the controller functional module of the source enhanced base station via the base station functional module of the source enhanced base station. The switching decision is performed by the controller functional module of the source enhanced base station.

Step 503: The source enhanced base station sends a switching command which carries related information of the cell under the target enhanced base station to the core network.

In the above, the related information of the cell under the target enhanced base station includes: cell identification number, frequency and currently used voice coding and decoding type, etc. of the cell under the target enhanced base station. When determining the target enhanced base station, the source enhanced base station can refer to the resource occupation condition and the related information of the cell of the adjacent enhanced base stations acquired via the inter-base-station interface functional module to add or verify the related information of the adjacent cells carried in the measurement report, so as to further optimize the switching process. The switching command is sent to the core network via the A interface functional module of the source enhanced base station.

Step 504: The core network sends the received switching command sent by the source enhanced base station to the target enhanced base station.

Step 505: After receiving the switching command and performing the switching resource preparation, the target enhanced base station replies a switching request acknowledgement command which carries related information of the target switching cell to the core network.

In the above, the switching resource preparation includes: allocating a wireless channel to be used, activating the wireless channel to be used, and configuring the voice coding and decoding type etc. corresponding to the wireless channel to be used. The related information of the target switching cell includes: cell identification number, frequency, currently used voice coding and decoding type etc. of the target switching cell.

Herein, that the target enhanced base station performs the switching resource preparation specifically includes:

the A interface functional module of the target enhanced base station receives the switching command sent from the core network, and sends the switching command to the controller functional module of the target enhanced base station the controller functional module of the target enhanced base station sends, after receiving the switching command, a switching resource preparation command to a base station functional module of the target enhanced base station; after receiving the switching resource preparation command, the base station functional module of the target enhanced base station performs the switching resource preparation.

Step 506: The core network sends the switching request acknowledgement command replied by the target enhanced base station to the source enhanced base station.

Step 507: After receiving the switching request acknowledgement command, the source enhanced base station orders the MS to access the target enhanced base station, completes the cell switching between different enhanced base stations, and then this switching process is completed.

Herein, that the source enhanced base station orders the MS to access the target enhanced base station specifically includes the steps as follows.

Step a3. After receiving the switching request acknowledgement command sent by the core network, the source enhanced base station writes related information of the target switching cell carried in the switching request acknowledgement command into a wireless interface switching command, and sends the wireless interface switching command to the MS.

In the above, the specific steps that the source enhanced base station processes the switching request acknowledgement command are: the A interface functional module of the source enhanced base station receives the switching request acknowledgement command sent by the core network and sends the switching request acknowledgement command to the controller functional module of the source enhanced base station; the controller functional module of the source enhanced base station writes related information of the target switching cell carried in the switching request acknowledgement command into the wireless interface switching command, and sends the wireless interface switching command to the base station functional module of the source enhanced base station; the base station functional module of the source enhanced base station sends the wireless interface switching command to the MS via the Um interface functional module of the source enhanced base station.

Step b3. After receiving the wireless interface switching command, the MS accesses the wireless channel to be used according to the related information of the target switching cell carried in the wireless interface switching command, and sends a wireless interface switching completed command to the target enhanced base station.

Step c3. The target enhanced base station forwards the received wireless interface switching completed command to the core network.

In the above, the process of receiving and forwarding the wireless interface switching completed command specifically includes:

the Um interface functional module of the target enhanced base station receives the wireless interface switching completed command and transmits the wireless interface switching completed command to the base station functional module of the target enhanced base station; after analyzing the wireless interface switching completed command, the base station functional module of the target enhanced base station forwards the wireless interface switching completed command to the controller functional module of the target enhanced base station; the controller functional module of the target enhanced base station analyzes the received wireless interface switching completed command, and forwards the wireless interface switching completed command to the core network via the A interface functional module of the target enhanced base station.

Step d3. After receiving the wireless interface switching completed command, the core network sends a release command to the source enhanced base station; after receiving the release command sent by the core network, the source enhanced base station releases the original wireless resources occupied by the MS, and sends a release completed command to the core network, thus the cell switching between different enhanced base stations is completed.

In the above, the process that the source enhanced base station receives and executes the release command specifically includes:

the A interface functional module of the source enhanced base station receives the release command sent by the core network and sends the release command to the controller functional module of the source enhanced base station; the controller functional module of the source enhanced base station forwards the release command to the base station functional module of the source enhanced base station; the base station functional module of the source enhanced base station releases the original wireless resources occupied by the MS.

As mentioned above, in virtue of the technical solution provided by the embodiments of the present invention, the enhanced base station carries out the functions of the BTS and the BSC in the traditional GSM system independently, and further forms a GSM system including an enhanced base station and a core network. The service data and signaling sent from the MS are merely processed by the enhanced base station and the core network. Compared with the twice forwarding by the BTS and the BSC in the conventional GSM system, the number of passed forwarding devices are decreased; therefore reducing the transmission time for service data and signaling and improving the reliability of transmission.

The foregoing description is only the preferred embodiments of the present invention, and shall not limit the present invention. As for those skilled in the art, the present invention can have various modifications and changes. Any modification, equivalent replacement, and improvement etc. within the principle and spirit of the present invention should be included in the protection scope of the present invention.

What is claimed is:

1. An enhanced base station, comprising:
    a Um interface functional module, configured to receive service data and signaling sent by a mobile station (MS), or send service data and signaling to the MS;
    a base station functional module, configured to carry out a wireless channel resource management according to a signaling sent by the MS or under control of a controller functional module, and control the Um interface functional module and an A interface functional module to forward the service data;
    the controller functional module, configured to control the base station functional module to carry out the wireless channel resource management; and the A interface functional module, configured to receive the service data or signaling sent by a core network, or send the service data or signaling to the core network;

wherein the base station functional module comprises:

a resource management module, configured to allocate and activate, according to a wireless channel resource request sent by the MS or a switching resource preparation command sent by the controller functional module, wireless channel resources for the MS, and establish a connection with the MS; and configured to disconnect with the MS and release the wireless channel resources occupied by the MS according to a release command sent by the controller functional module; and a forwarding control module, configured to control the A interface functional module to send the service data, which are sent by the MS, to the core network, and control the Um interface functional module to send the service data, which are sent by the core network, to the MS.

2. The enhanced base station according to claim 1, wherein the enhanced base station further comprises:

an inter-base-station interface functional module, configured to perform a signaling interaction between enhanced base stations.

3. A GSM system for realizing a flat mobile communication, comprising:

an enhanced base station, configured to manage wireless channel resources according to a signaling sent by a mobile station (MS) or a core network; and configured to send service data, which are sent by the MS, to the core network, or send service data, which are sent by the core network, to the MS; and the core network, configured to send received service data or signaling, which are/is sent by a calling party, to the enhanced base station, or send service data or signaling, which are/is sent by the enhanced base station, to the calling party;

wherein the enhanced base station comprises: a Um interface functional module, a base station functional module, a controller functional module and an A interface functional module;

correspondingly, the enhanced base station provides a Um interface for the MS via the Um interface functional module; carries out a wireless channel resource management and forwarding of the service data via the base station functional module and the controller functional module; and connects with the core network, receives the service data or signaling sent by the core network, or sends the service data or signaling to the core network via the A interface functional module;

wherein the base station functional module comprises:

a forwarding control module, configured to control the A interface functional module to send the service data, which are sent by the MS, to the core network, and control the Um interface functional module to send the service data, which are sent by the core network, to the MS.

4. A method for realizing a flat mobile communication, comprising:

a core network sending a calling request, which is sent from a calling party, to a called enhanced base station; the called enhanced base station sending the received calling request to a cell, which is covered by the called enhanced base station, to call a called MS, and ordering the called MS to access the called enhanced base station; the core network sending an access completed command replied by the called enhanced base station to the calling party to complete a calling procedure; and the core network sending service data, which are sent from the calling party, to the called enhanced base station, and the called enhanced base station forwarding the service data to the called MS; the core network sending service data, which are sent by the called MS and forwarded by the called enhanced base station, to the calling party to realize a conversation between a calling terminal and a called terminal;

wherein the step of the called enhanced base station forwarding the service data to the called MS comprises:

an A interface functional module of the called enhanced base station receiving the service data and sending the service data to a base station functional module of the called enhanced base station; the base station functional module of the called enhanced base station sending the service data to the called MS via a Um interface functional module;

the step of the called enhanced base station forwarding the service data, which are sent by the called MS, to the core network comprises:

the Um interface functional module of the called enhanced base station receiving the service data sent by the called MS and sending the service data to the base station functional module of the called enhanced base station; the base station functional module of the called enhanced base station sending the service data to the core network via the A interface functional module.

5. The method for realizing the flat mobile communication according to claim 4, wherein the step of the called enhanced base station sending the received calling request to a cell covered by the called enhanced base station to call a called MS, and Ordering the called MS to access the called enhanced base station comprises:

a) an A interface functional module of the called enhanced base station receiving the calling request sent by the core network, and sending the calling request to a controller functional module of the called enhanced base station; the controller functional module of the called enhanced base station forwarding the calling request to a base station functional module of the called enhanced base station, and the base station functional module sending the calling request to the cell under the called enhanced base station via a Um interface functional module;

b) the called MS replying, after receiving a paging command, a paging response to the called enhanced base station;

c) the Um interface functional module of the called enhanced base station receiving the paging response, and sending the paging response to the base station functional module of the called enhanced base station; the base station functional module of the called enhanced base station allocating a wireless channel for the called MS, activating the wireless channel, and sending an access command to the called MS; and d) the called MS receiving the access command, accessing the activated wireless channel, and replying an access succeeded command to the called enhanced base station.

6. The method for realizing the flat mobile communication according to claim 4, wherein the method further comprises a cell switching flow between different enhanced base stations, which comprises:

a source enhanced base station receiving a measurement report reported by an MS, and sending a switching command to the core network if determining, according to the received measurement report, that it is required to perform a switching; the core network sending to a target enhanced base station the received switching command sent from the source enhanced base station; the target enhanced base station receiving the switching command, and replying a switching request acknowledgement command to the core network after performing a switching resource preparation; the core network sending to the source enhanced base station the switching request acknowledgement command replied by the target enhanced base station; and the source enhanced base station ordering, after receiving the switching request acknowledgement command, the MS to access the target enhanced base station to complete the cell switching between different enhanced base stations.

7. The method for realizing the flat mobile communication according to claim 6, wherein the step of the target enhanced base station receiving the switching command and performing the switching resource preparation comprises:

an A interface functional module of the target enhanced base station receiving the switching command sent from the core network, and sending the switching command to a controller functional module of the target enhanced base station; the controller functional module of the target enhanced base station sending, after receiving the switching command, a switching resource preparation command to a base station functional module of the target enhanced base station; after receiving the switching resource preparation command, the base station functional module of the target enhanced base station allocating a wireless channel to be used, activating the wireless channel to be used, and configuring a voice coding and decoding type corresponding to the wireless channel to be used.

8. The method for realizing the flat mobile communication according to claim 6, wherein the step of the source enhanced base station ordering, after receiving the switching request acknowledgement command, the MS to access the target enhanced base station comprises:

a3) the source enhanced base station writing, after receiving the switching request acknowledgement command sent from the core network, related information of a target switching cell carried in the switching request acknowledgement command into a wireless interface switching command, and sending the wireless interface switching command to the MS;

b3) the MS accessing, after receiving the wireless interface switching command, the wireless channel to be used according to the related information of the target switching ceil carried in the wireless interface switching command, and sending a wireless interface switching completed command to the target enhanced base station;

c3) the target enhanced base station forwarding the received wireless interface switching completed command to the core network; and d3) the core network receiving the wireless interface switching completed command, sending a release command to the source enhanced base station; the source enhanced base station releasing, after receiving the release command sent from the core network, the original wireless resources occupied by the MS, and sending a release completed command to the core network to complete the cell switching between different enhanced base stations.

* * * * *